United States Patent

[11] 3,581,017

[72] Inventors Roger L. Stevens
Sierra Madre;
Peter A. Putnam, Montebello; Martin Sicona, San Jose, Calif.

[21] Appl. No. 736,835
[22] Filed June 13, 1968
[45] Patented May 25, 1971
[73] Assignee Aerojet-General Corporation
ElMonte, Calif.

[54] ELECTRONIC MULTIPLEXER
7 Claims, 14 Drawing Figs.

[52] U.S. Cl. .......... 179/15A, 179/15BL, 179/15BS
[51] Int. Cl. .......... H04j 3/04
[50] Field of Search .......... 179/15 (ACS), 15 (LL), 15 (SYNC), 15 (ASYNC), 15 (VDR), 15 (A), 15 (AM); 307/251, 255, 93; 178/50

[56] References Cited
UNITED STATES PATENTS

| | | | |
|---|---|---|---|
| 3,386,053 | 5/1968 | Priddy .......... | 307/255 |
| 3,427,475 | 2/1969 | Wilkinson et al. .......... | 307/243 |

*Primary Examiner*—Kathleen H. Claffy
*Assistant Examiner*—David L. Stewart
*Attorneys*—Edward O. Ansell, D. Gordon Angus and John E. Wagner

ABSTRACT: This disclosure involves an all electronic time division multiplexer system designed to sample a large number of millivolt level signal sources at a megacycle sampling rate. [It also includes blanking circuitry which eliminates unwanted transients.] The system comprises three subsystems, a counter and two multiplexer gate subsystem, the first subsystem operating at the basic sampling rate and the second synchronized by the counter at the higher rate. The disclosure illustrates synchronization, blanking and gating circuitry to accomplish the necessary functions. Timing diagrams illustrate the switching sequences to provide accurate multiplexing without loss of data or introduction of unwanted switching transients into the multiplexed signal.

INVENTORS
PETER A. PUTNAM
ROGER L. STEVENS
MARTIN SYGONA
by John F. Wagner
Edward B. Ansell INVENTORS
PETER A. PUTNAM
ROGER L. STEVENS
MARTIN SIGONA
by John E. Wagner
Edward O. Ansell INVENTORS
PETER A. PUTNAM
ROGER L. STEVENS
MARTIN SIGONA
by John E. Wagner
Edward O. Ansell INVENTORS
PETER A. PUTNAM
ROGER L. STEVENS
MARTIN SIGONA
by John C. Wagner
Edward O. Ansell INVENTORS
PETER A. PUTNAM
ROGER L. STEVENS
MARTIN SIGONA
by John F. Wagner
Edward O. Ansell INVENTORS
PETER A. PUTNAM
ROGER L. STEVENS
MARTIN SIGONA
by John E. Wagner
Edward B. Ansell INVENTORS
PETER A. PUTNAM
ROGER L. STEVENS
MARTIN SIGONA
by John F. Wagner
Edward O Ahsell INVENTORS
PETER A. PUTNAM
ROGER L. STEVENS
MARTIN SIGONA
by John F. Wagner
Edward G. Ansell INVENTORS
PETER A. PUTNAM
ROGER L. STEVENS
MARTIN SIGONA
by John F. Wagner
Edward O. Ansell INVENTORS
PETER A. PUTNAM
ROGER L. STEVENS
MARTIN SIGONA
by John F. Wagner
Edward O. Ansell

ELECTRONIC MULTIPLEXER

BACKGROUND OF THE INVENTION

This invention is in the field of switching systems designed to multiplex a large number of varying unidirectional signals. The system is characterized in that it is all electronic incorporating no moving parts and accomplishes the multiplexing by a two-step process, including multiplexing a large number of incoming signals onto a subcarrier at a relatively low rate followed by high-speed multiplexing of the subcarriers. The high-speed multiplexing is performed in a manner to produce precisely timed short switching transients and the circuitry includes blanking circuitry which effectively removes the unwanted transient with minimum of data loss. The system furthermore is arranged in dual banks synchronized so that switching of one bank occurs while the second bank is sampled.

In the past, multiplexing of large numbers of input signals has been accomplished either by mechanical switches or by single-stage electronic multiplexers operating at rates low enough to produce minimum switching transients.

SUMMARY OF THE INVENTION

One feature this invention resides in the combination of low- and high-speed mulitplexers operated in synchronism to provide high-speed multiplexing of a large number of signals.

Still another feature is in the division of the low-speed multiplexer into two banks which are alternately switched and sampled to minimize crosstalk transients.

One other feature involves the counter circuitry which provides synchronizing pulses for the entire multiplexer, monitors synchronism and corrects synchronism errors. Still another feature resides in the combination of a high-speed multiplexer and a pulse gate effectively synchronized and operating to eliminate any switching transients from the high-speed multiplexer output.

For a more complete understanding of my invention, reference is made to the following explanation and the accompanying drawings in which.

Figure 1:
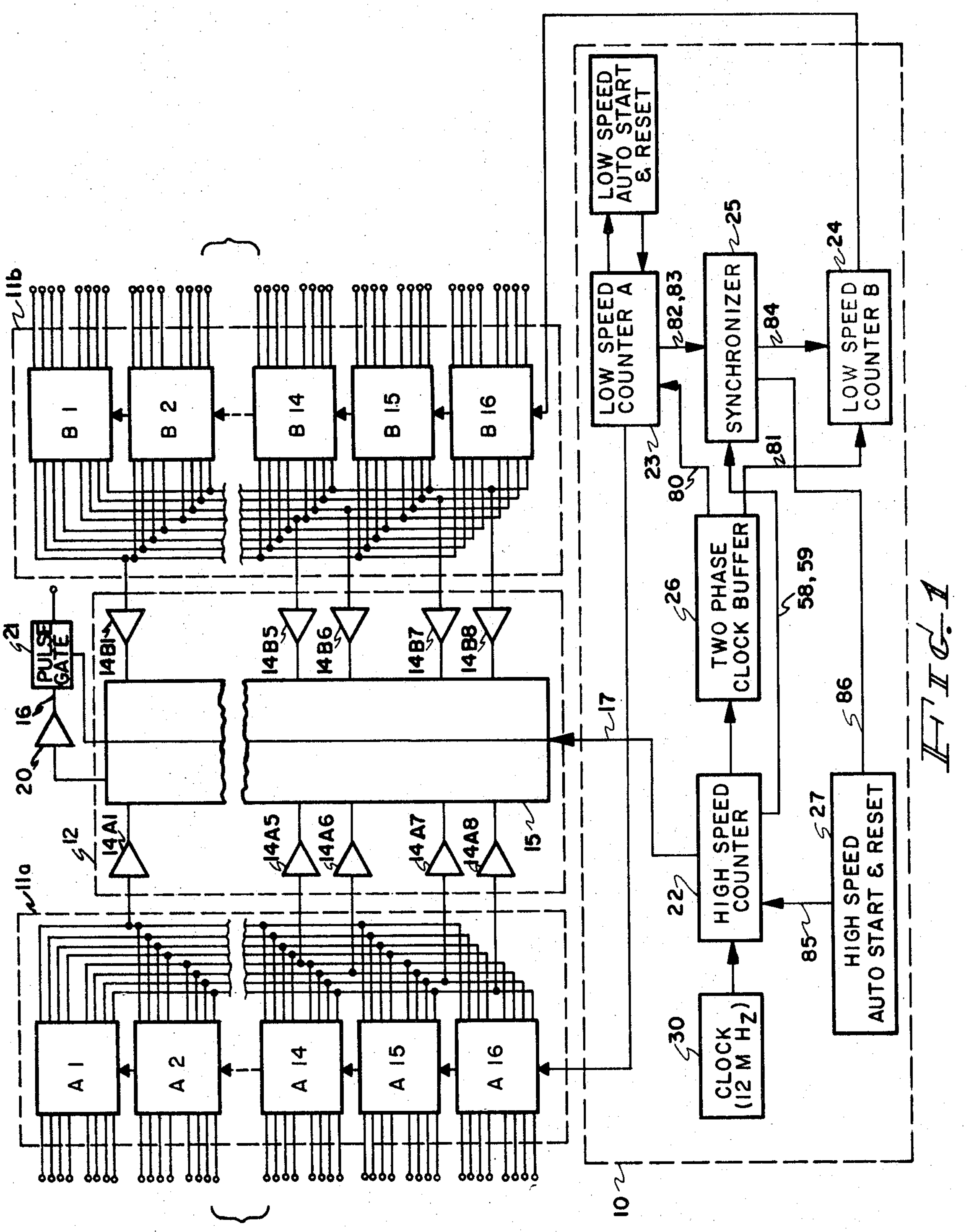
FIG. 1 is the system of this invention.
Figure 9:
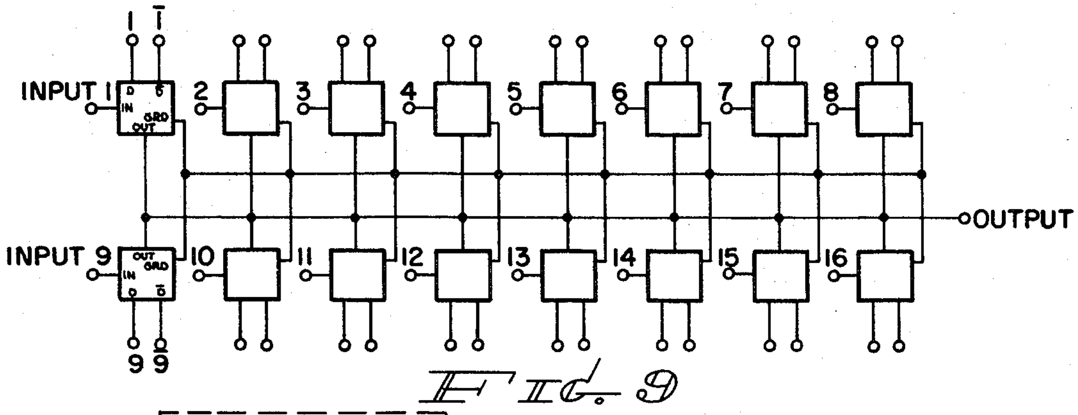
Figure 9A:
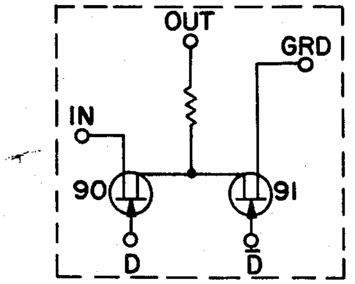
Figure 3:
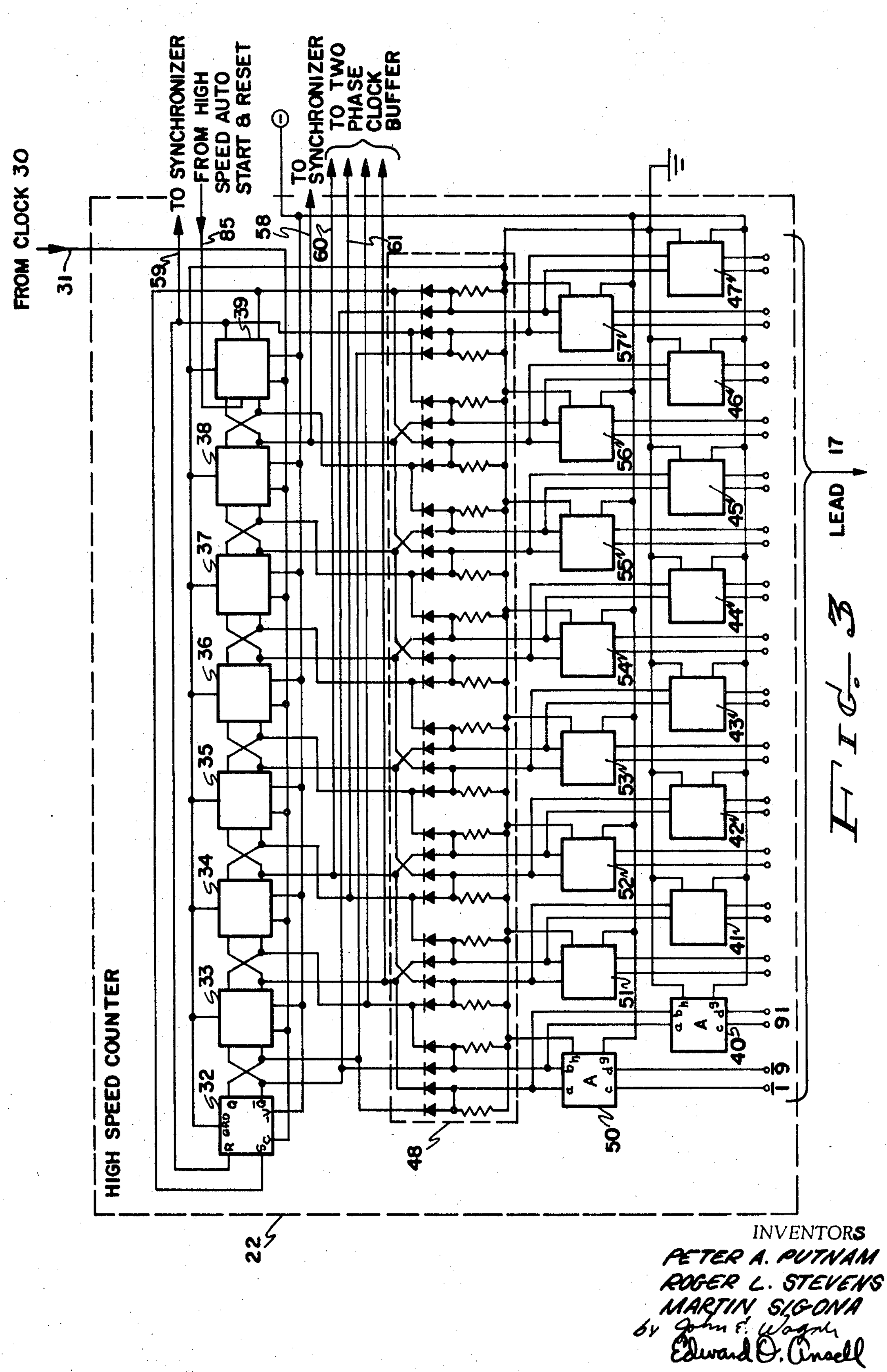
FIG. 3 is the electrical schematic of the high-speed counter.
Figure 11:
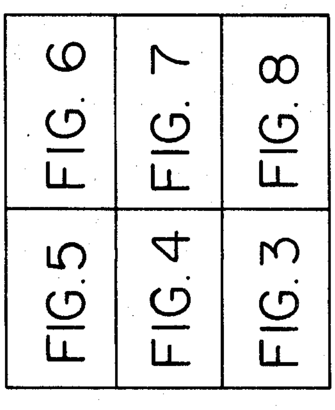
Figure 5:
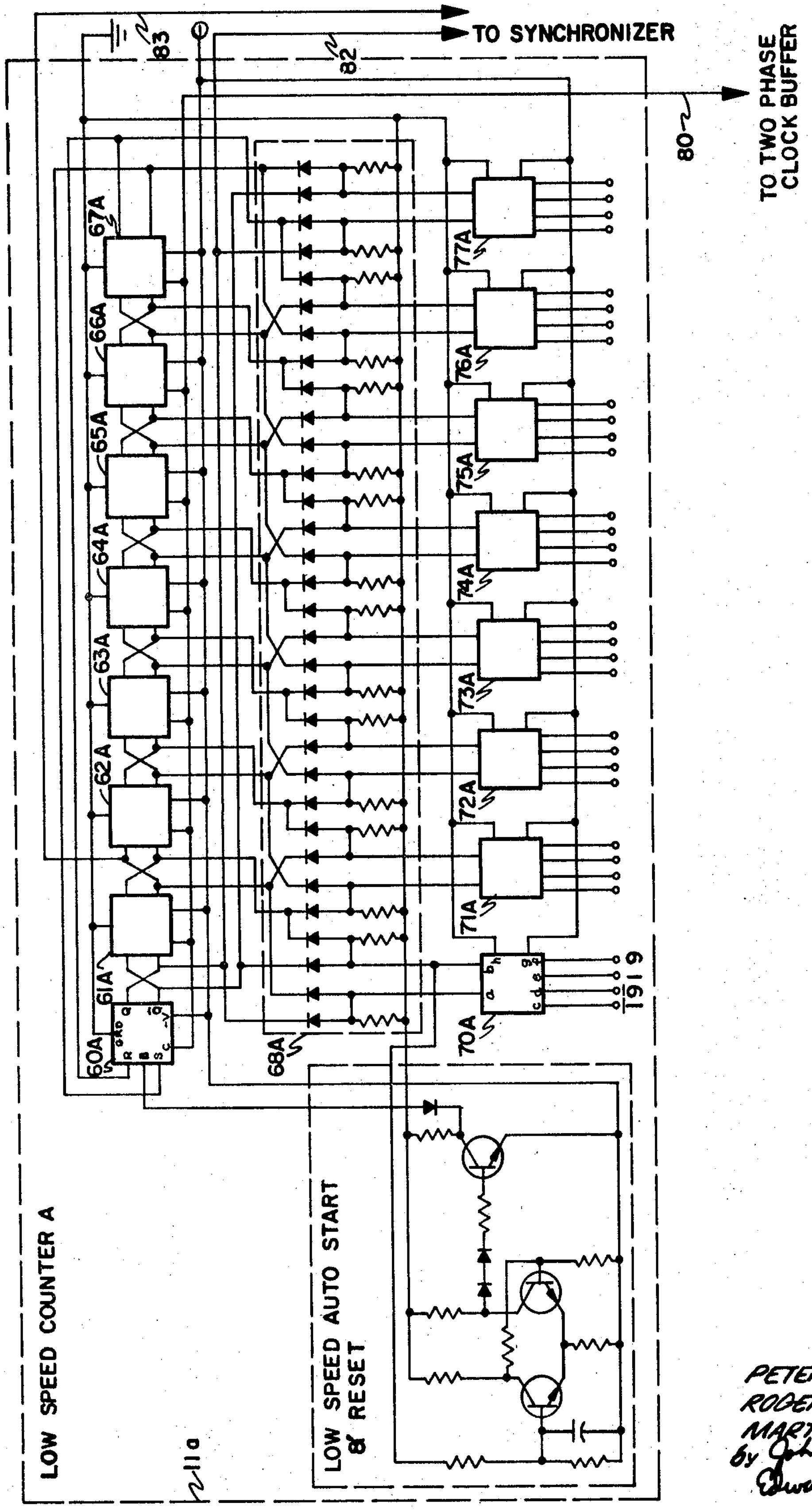
FIG. 5 is the electrical schematic of the low-speed counter A.
Figure 6:
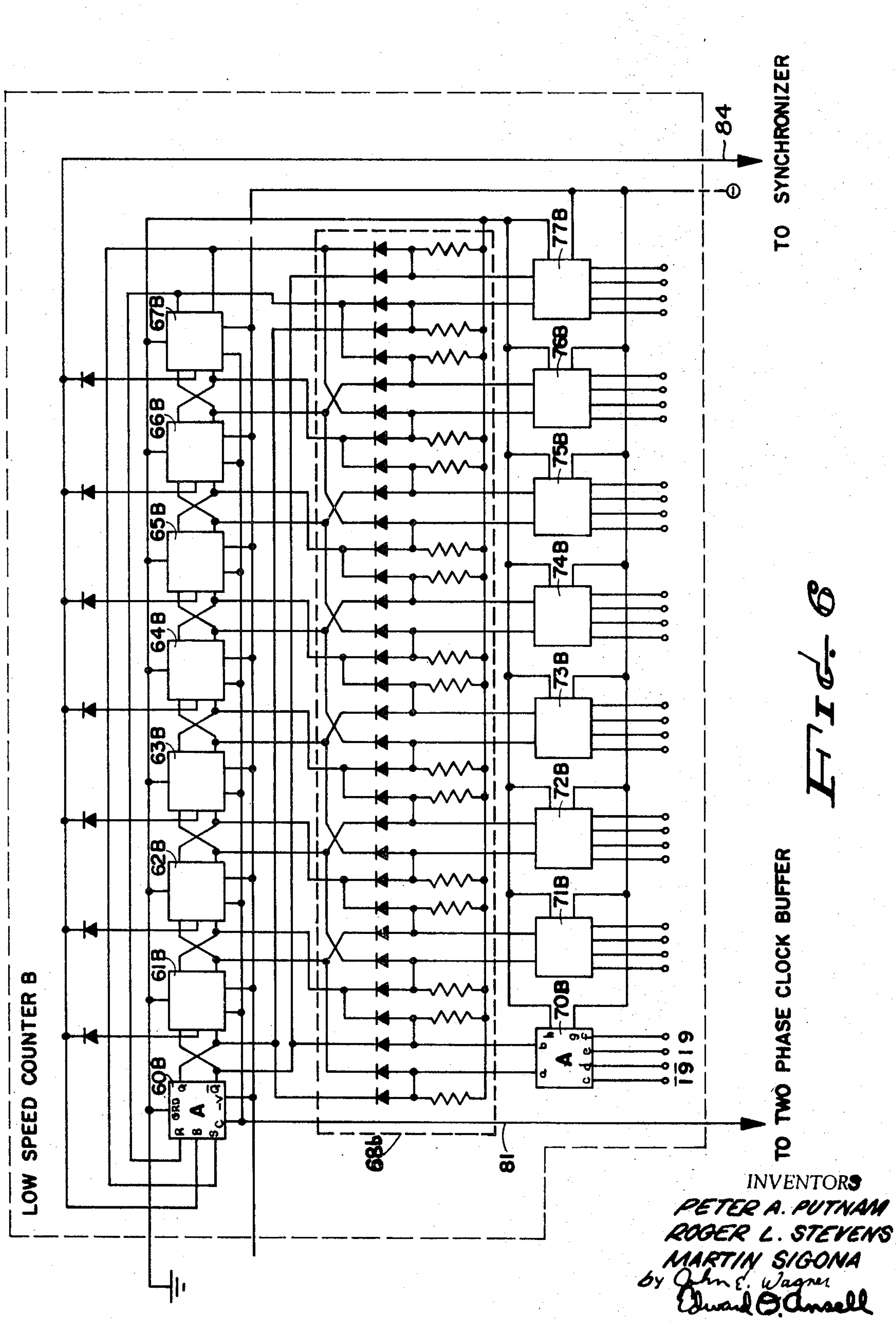
FIG. 6 is the electrical schematic of the low-speed counter B.
Figure 7:
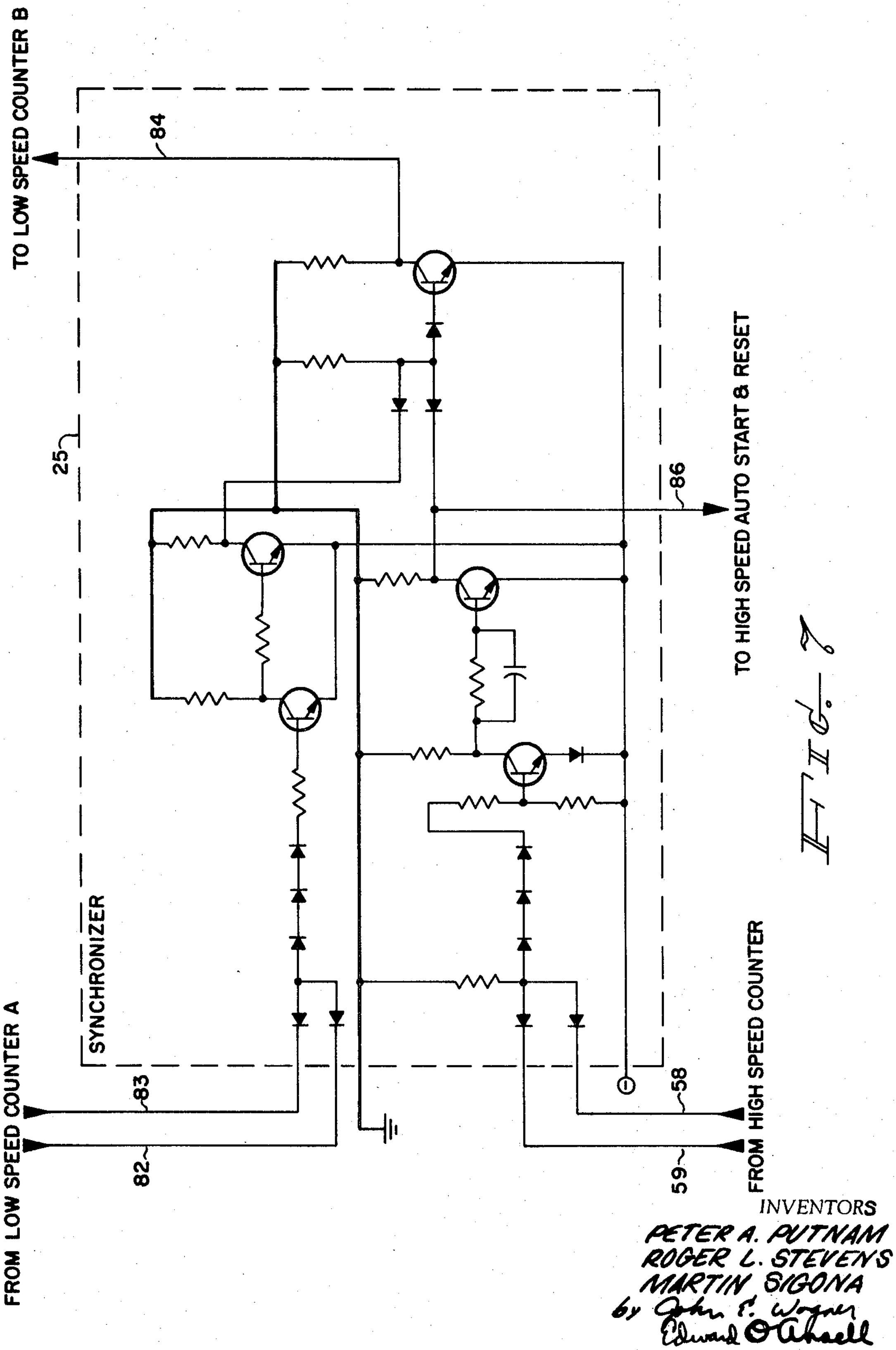
FIG. 7 is the electrical schematic of the system synchronizer.
Figure 10:
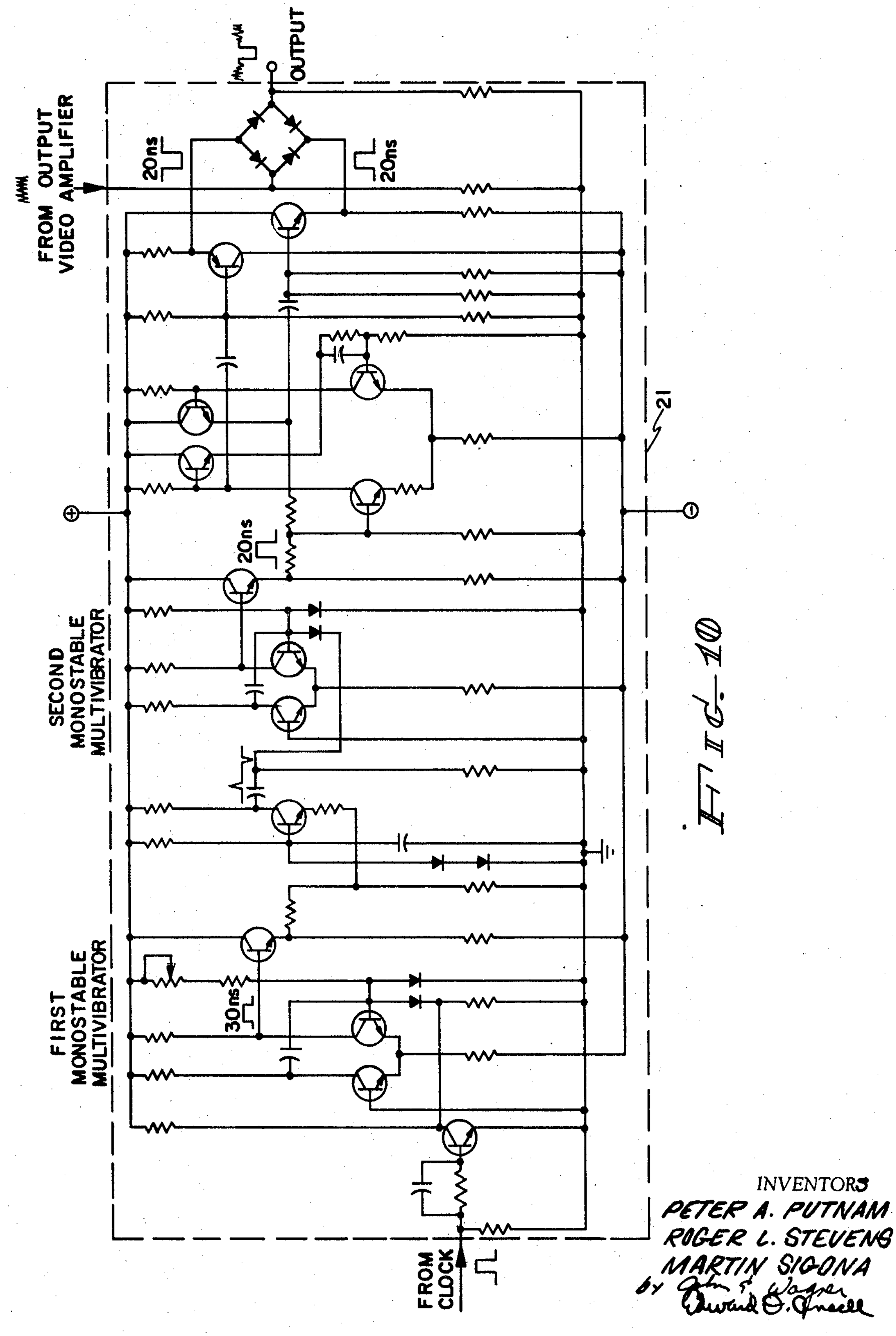
Figure 12:
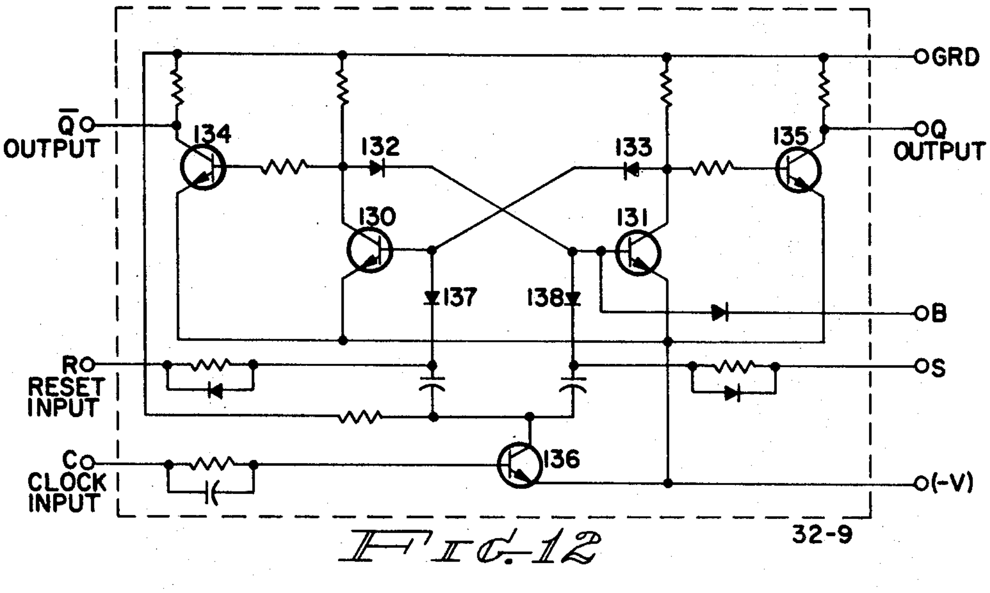
Figure 13:
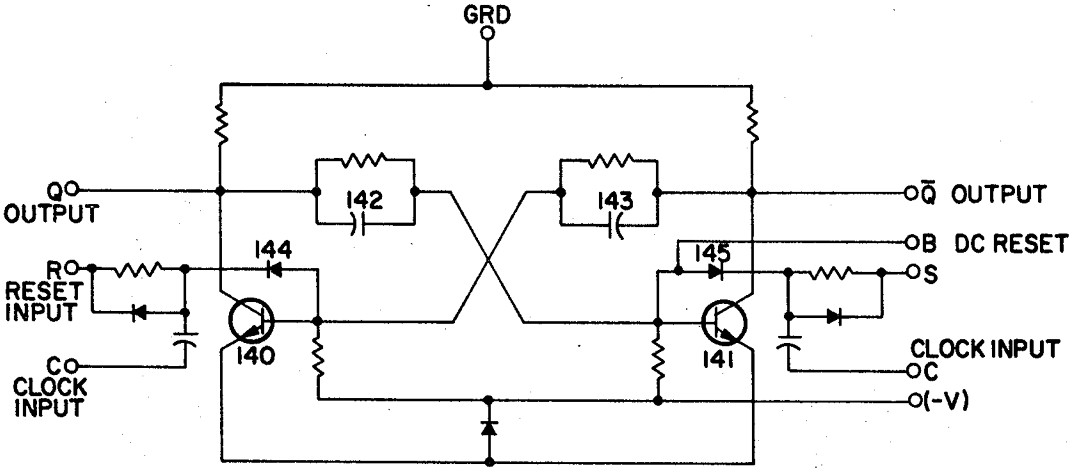

FIG. 9 and 9*a* are block diagrams and electrical schematics of the multiplexer gates;

FIG. 10 is the electrical schematic of the output pulse gate;

FIG. 11 illustrates the arrangement of FIGS. 3—8 to produce the counter 10 of FIG. 1;

FIG. 12 is an electrical schematic of multivibrators of the high-speed counter of FIG. 3; and FIG. 13 is an electrical schematic of the multivibrators of the low-speed counters of FIGS. 5 and 6.

MULTIPLEXER SYSTEM DESCRIPTION

Now referring to the drawing, FIG. 1, wherein it can be seen that the multiplexer of this invention is separated into three subsystems: a counter subsystem 10 and two multiplexer gate subsystem—dual bank low-speed system 11 and a single high-speed subsystem 12. The low-speed gate subsystem 11 contains 32 groups of eight multiplexer gates 11*a* and 11*b* operating at a rate of 750 kilosamples/second. The high-speed subsystem 12 is made up of an array of 16 high-speed gates operating at a rate of 12 megasamples/second. This 12 megasample/second multiplexer subsystem 12 scans the output lines of the 32 groups of the low-speed multiplexers subsystems 11*a* and 11*b*. The high-speed multiplexer 12 combines the 16 input signals from the low-speed multiplexers 11*a* and 11*b* on a time division multiplex basis onto a single output line 16 through a video amplifier 20 and a pulse gate 21.

This two subsystem arrangement optimizes fan-in considerations of the large number of inputs, allows most switching to be done at the slower rate, and simplifies the design of the counter system that drives the multiplexer gates. The 32 groups of eight gates are divided into two subchannel groups A and B, each containing 16 groups of eight gates (FIG. 1).

The outputs of the first gate of each of the 16 subchannel A groups are summed at the input to a subchannel video amplifier, for example, 14A1. Likewise, all the remaining sets of gates in the subchannel groups are summed at their respective video amplifier 14A2—8 inputs. High-speed multiplexer gates 1 through 8 (contained within box 15 and shown in more detail in FIG. 9) sample the eight video amplifiers 14A1—8 derived from subchannel A, and gates 9 through 16 sample the video amplifiers 14B1—8 derived from subchannel B.

Figure 2:
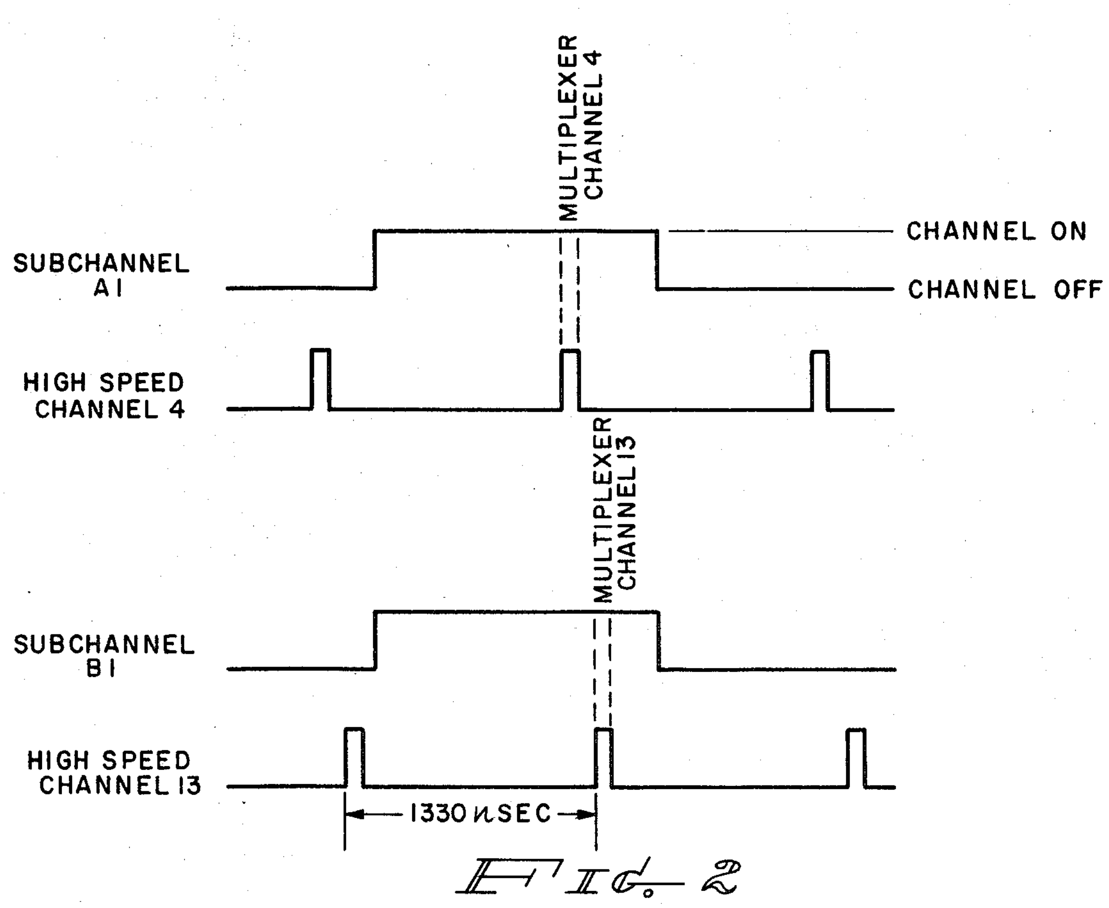
FIG. 2 is the graphical representation of the switching sequence of the system of FIG. 1.

The time relationship of operations of the multiplexers 11 and 12 may best be understood by reference to FIG. 2 in connection with FIGS. 1 and 9. The subchannel groups from multiplexer 11*a* and 11*b* are switched in a complementary manner: the first gate A1 in each group of subchannel A is switched while the first gate B1 in each group of subchannel B is sampled by the 12 megasample/second multiplexer 12. When the gate A1 in each group of subchannel A is sampled, the gate B2 in each group of subchannel B is switched. This sequence continues through the eight gates in the subchannel groups 11A and 11B. This switching and sampling sequence, staring with the first gate in the first group of subchannel A and ending with the eighth gate in the 16th group of subchannel B, constitutes a full multiplexer frame (all channels have been commutated). This technique provides a minimum of seven sample times (83.3 nsec. each) of settling time before each subchannel gate is sampled by the high-speed (12 megasample/second) multiplexer. This settling time allows all switching transients in the low-speed (750 kilosample/second) sample to settle out before the high-speed multiplexer 12 samples the channel.

A sample frame is completed when the high-speed multiplexer has made 16 of the 16 -sample cycles. The 16 multiplexer channels are summed onto the line 16 at the output video amplifier 20 shown in FIG. 1. The video signal at the output of this summing amplifier has a large spike content due to the switching transients generated in the high-speed multiplexer 12 gates. These spikes occur when the multiplexer is switching from one channel to another. A gating system made up of pulse gate 21 described below removes the spikes by blanking out all signal during the multiplexer switching.

Now referring again to FIG. 1, the counter subsystem provides all the drive signals for the multiplexer gates, synchronizes the high-speed and low-speed multiplexer subsystems, drives the output pulse gate 21, and provides video display system synchronizing signals. It is made up of the components described below.

The drive signals for the low-speed and high-speed multiplexer gates 11*a* and 11*b* and 15 are generated by a set of binary counters in the counter subsystem 10 which contains three 16 -count Johnson counters 22, 23 and 24; counter 22 operating at a 12 megacount/second rate and counters 23 and 24 operating at a 750 kilocount/second rate. The subsystem also includes the necessary synchronizer 25 and buffer stage 26 and waveshaping circuits. The counters are driven by a 12 MHz. master clock 30.

MASTER CLOCK

Figure 4:
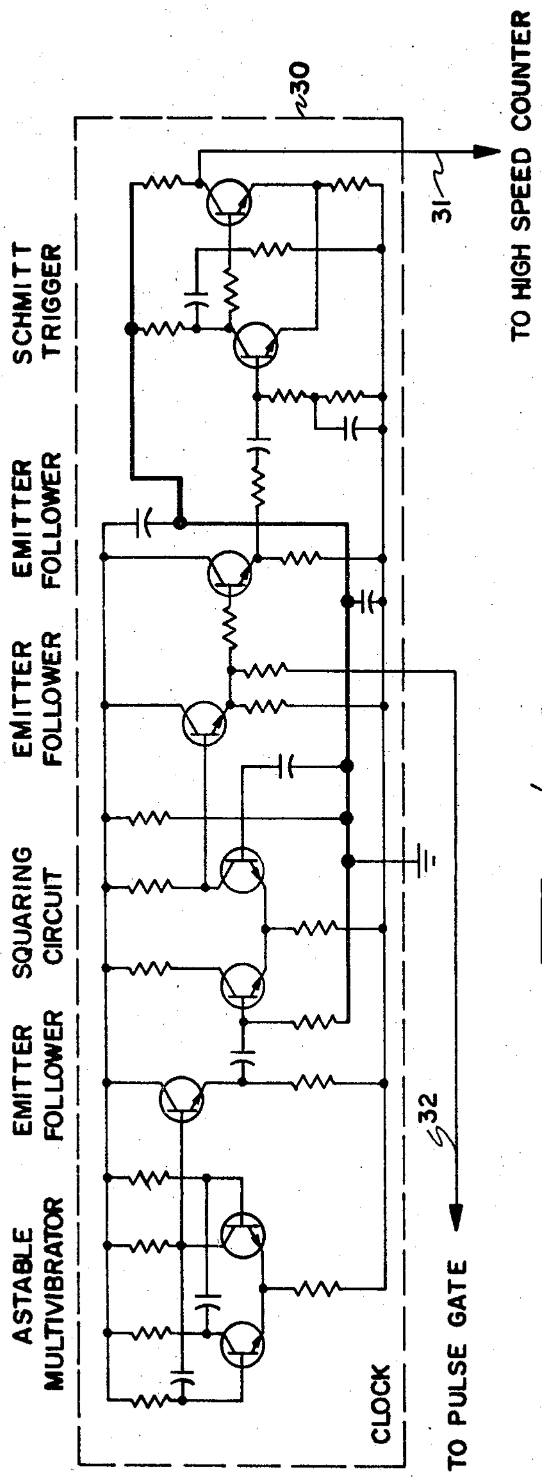
FIG. 4 is the electrical schematic of the counter clock.

A master clock 30 shown in detail in FIG. 4 controls the counter subsystem timing. The clock generates a pulse every 83.3 nsec., the reciprocal of 12 MHz. Since all portions of the multiplexer are slaved to the clock, extreme frequency stability is not required. An astable multivibrator in clock 30 serves the purpose in this instance. A pulse squaring circuit follows the multivibrator with an emitter follower providing isolation. Two additional emitter follower stages follow the pulse squaring circuit providing two low impedance outputs. A Schmitt trigger circuit is fed by one of these outputs. This Schmitt trigger drives the high-speed counter clock line 31. The second output emitter follower provides a drive for the Pulse gate of FIG. 10.

HIGH-SPEED COUNTER

The high-speed counter as shown in FIG. 3 is an eight stage binary counter of the Johnson counter type, counting in a 16-count cycle. The Johnson counter is a parallel binary counter having extremely transient-free output waveforms. It requires a simpler decoding scheme than that of a synchronous counter and the decoding loads each flip-flop symmetrically. It is characterized as a multistage shift register with reversed feedback between the last and first stages.

The counting stages comprise bistable multivibrators 32—39 driven by clock 30 of FIG. 4 over lead 31.

The multivibrator 32—39 outputs are decoded in an array of diode gates 48 which in turn pass negative pulses through high-speed waveshapers 40—47 and thence to the gates 15 of FIGS. 1 and 9. Complements of the pulses from diode gates 48 are developed in inverter waveshapers 50—57 are similarly fed to the high-speed gates 15. The switching signals developed in the high-speed counter 22 are shaped in the circuits 40—47 and 50—57 to have fast rise and fall times of approximately 5 nsec.

The outputs from multivibrator 34 are used as clock signals over leads 60 and 61 for the two low-speed counters 11*a* and 11*b* of FIG. 1. These signals are amplified and shaped by the two-phase clock buffer 26 of FIGS. 1 and 8. The buffers are simply noninverting pulse amplifiers. The high-speed counter also provides input pulses from multivibrator 39 to the synchronizer 25 via leads 58 and 59. A typical multivibrator 32 as shown in FIG. 12 includes a pair of NPN transistors 130 and 131 crosscoupled by diodes 132 and 133 and driving common emitter output buffer stages 134 and 135. The multivibrators 32—39 are gated by pulses from the clock on lead C through transistor 136 and steering diodes 137 and 138.

LOW-SPEED COUNTER

The two low-speed counters 23 and 24 of FIGS. 5 and 6, respectively, each are identical counters operating in a 16-count mode. The counter block consists of eight bistable multivibrators 60A—67A and 60B—67B, respectively, interconnected in the Johnson counter configuration, and employing diode gate decoding, and pulse waveshaping and inverting circuits basically similar to the high-speed counter 22.

The multivibrator 60—67A and 60—67B outputs are decoded with diode gates 68A and 68B, respectively. The low-speed multiplexer gates 11 are driven by negative pulses and their complements, but the decoding diode gates 68A and 68B of the low-speed counters 11*a* and 11*b* provide only the negative pulses. The negative pulses and their complements, having the required rise and fall times, are formed by the inverter/waveshapers 70A—77A and 70B—77B. These are pulse amplifiers having both inverting and noninverting outputs. The inverter/waveshapers directly drive the subchannel multiplexer gates A1—16 and B1—16 of FIG. 1.

The bistable multivibrators 60—67 are shown in detail in FIG. 13 as including active elements, transistors 140 and 141, crosscoupling networks 142 and 143, clock gating diodes 144 and 145 and DC reset over lead B. All are arranged in conventional bistable multivibrator configuration.

COUNTER SYNCHRONIZATION AND MODE SELECTION CIRCUITRY

The two low-speed counters 11*a* and 11*b* are phased with respect to one another by eight high-speed counts but this does not ensure that the low-and high-speed counters have the proper outputs in synchronization. The synchronizer 25 of FIGS. 1 and 7 sets the counter outputs in synchronization by comparing an output of the high-speed counter over leads 58 and 59 with that of the low-speed counter A over leads 82 and 83 and forcing the low-speed counter B to the correct count by a synchronizing signal over lead 84. If the counters are not correctly synchronized, a gate in the synchronizer resets to the correct state all of the flip-flops through the lead 84 to DC reset gates in each state of the low-speed counter B.

Figure 8:
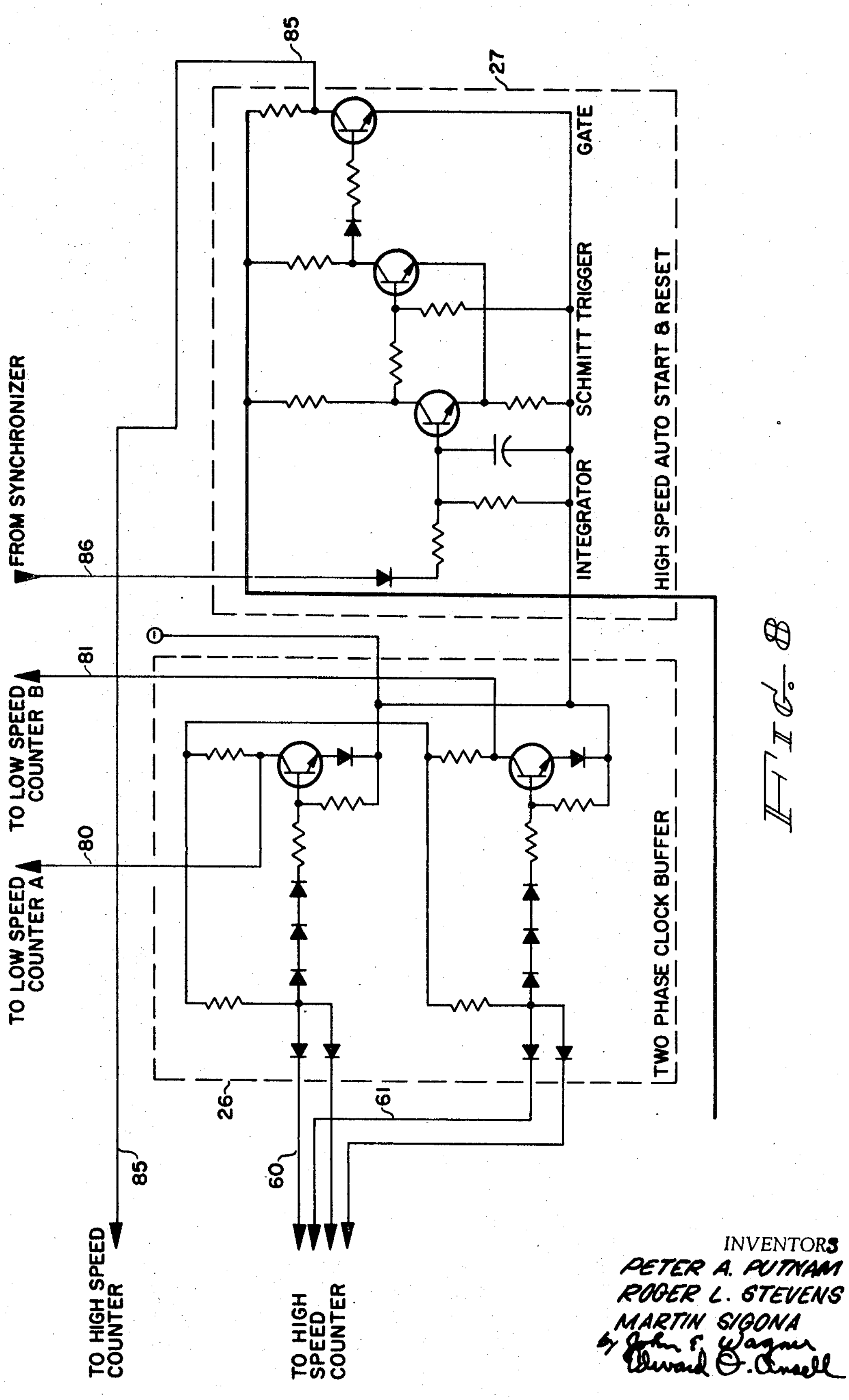
FIG. 8 is the electrical schematic of the two-phase clock buffer and high-speed auto set and reset circuits.

Since a Johnson-type counter can count in an undesirable mode (upon starting or when disturbed by a power supply transient), an automatic reset circuit 27 of FIGS. 1 and 8 has been provided to sample the high-speed counter output and, if the counter is operating in an undesirable mode, reset it to the correct mode. If the high-speed counter is operating correctly, an output pulse occurs once in every 16 counts. When it counts in an undesirable mode, an output pulse occurs two or more times in every 16 counts. An output of the high-speed counter 22 from the synchronizer 25 over lead 86 is integrated with an RC integrating circuit and the resulting voltage level is sampled by a Schmitt trigger circuit. If the counter is operating in an incorrect mode, the integrated signal level is large enough to switch the Schmitt trigger. The Schmitt trigger drives a transistor gate which sets one of the flip-flops in the high-speed counter to the 0 state over lead 85. The high-speed counter 22 continues to count with the one flip-flop held in the 0 state until the correct combination of multivibrator states is obtained. The Schmitt trigger of circuit 27 then resets (removing the fixed state from the flip-flop) and the (high-speed) counter 22 continues to count in the correct mode. The counter resetting sequence requires a maximum of 15 counts (one multiplex frame). The same circuit is operated to reset the high-speed counter. The low-speed counter B is reset by the synchronizing circuit 25 as described above.

MULTIPLEXER GATES

Each multiplexer gate as shown in FIGS. 9 and 9*a* is composed of a series-shunt pair of junction field effect transistors driven from complementary logic inputs (FIGS. 1 and 12). The series-shunt arrangement serves to reduce the switching spikes and noise level. When only series gates 90 of FIG. 9*a* are used, large spikes are generated at the output due to the capacitive (gate to drain) feed through of the switching signal. A shunt transistor 91 added to the switching module generates spikes of opposite polarity to those generated by the series switch. These spikes tend to cancel one another resulting in a small spike content. The cancellation is not perfect because of the difference in capacitance from unit to unit and the slight difference in rise and fall times of the complementary switching signals. The gates in both the subchannel (low frequency) and high frequency multiplexers are of the series-shunt configuration of FIG. 9*a*.

PULSE GATE

A fundamental problem in the design of a high-speed, low-level multiplexer is that of eliminating residual switching spikes from the high-speed multiplexer output. In this design, the spikes are removed with a balanced diode gate 21 shown in FIG. 10 and located at the output of the output video amplifier 20 and synchronized to the master clock 30 to blank the amplifier 20 output whenever the multiplexer changes channels. Since balanced circuitry is used throughout, drive signals do not appear in the output and the net result is elimination of the undesirable spikes.

Implementation of the pulse gate 21 as shown in FIG. 10 employs a first monostable multivibrator to delay the system's clock pulse until blanking is to be initiated, a second multivibrator to control the amount of time the output is to be blanked, and an amplifier to deliver equal positive and negative (balanced) drive pulses to a diode gate. A first monostable multivibrator runs for about 30 nsec. after it is triggered by a pulse from the clock. The trailing edge of its pulse is used to trigger the second monostable multivibrator. Thus, starting time of the second multivibrator is dependent on the pulse width of the first. Since pulse width is easily varied, a convenient means of adjusting the position in time of the second monostable's output is obtained. The "on" time of the second, or blanking, monostable multivibrator controls the amount of time the output will be cut off and is nominally 20 nsec. The blanking pulse width can also be easily varied for optimum performance. Output pulses from the blanking monostable are coupled to the gate driving amplifier which generates equal positive and negative pulses for the balanced switching operation.

Noise blanking is actually accomplished by four diodes arranged in a bridge configuration. Forward bias is supplied to the diodes by resistors from positive and negative sources. This establishes a low impedance path through the diodes and allows video signals to pass with little attenuation. During the 20 nsec. blanking period, emitter followers remove the forward bias and cause the diodes to look like an open circuit to the video signals. Transmission in this configuration is about 35 db. below the "on" condition. Transitions between off and on states are made in less than 5 nsec. and introduce approximately 20 mv. peak to peak of noise.

From the foregoing description it may be seen that an electronic time division multiplexer has been developed which, in the example given, multiplexers 256 lines of varying DC onto a single output line. Of course the number of signals sampled and sampling rate may be varied without departing from the principles of this invention. Switching transients are maintained at a minimum by means of a number of features of the invention. First the division of the multiplexer into two banks of low-speed multiplexers alternately switched and sampled while synchronized to a single high-speed multiplexer. The use of series-shunt switching gates in the multiplexer gates minimizes switching transients in each stage while the pulse gate at the very output of the multiplexer and synchronized to the master clock blanks the video amplifier output during switching periods. The cooperation of each of these circuits insures accurate high-speed multiplexing with minimum internally generated noise or transients in the output signal.

It is recognized that deviations from the specific embodiment shown may be made without departing from the spirit and scope of this invention.

The foregoing description is merely representative of one specific embodiment and is not to be considered as constituting the sole embodiment of the invention. It is recognized that one skilled in the art might make substitutions of equivalents or other changes without departing from the spirit of the invention. Therefore the scope of protection afforded to this invention under the U.S. Patent Laws is determined by the scope of the following claims including their equivalents.

We claim:

1. An electronic multiplexer comprising:

a low-speed multiplexer including a number of input lines from discrete signal sources, and two banks of gates for connecting groups of input lines to respective output lines, a high-speed multiplexer including means for connecting the output lines of the low-speed multiplexer in timed sequence to a single output line, a common switching signal source for said multiplexers including means for applying complementary switching signals of common rate to first and second banks of gates of the low-speed multiplexer to combine signals alternately from the two banks of the low-speed multiplexer, means for applying a switching signal of higher rate to the high-speed multiplexer, means for synchronizing the low-speed and high-speed multiplexers for connecting one of the banks of the low-speed multiplexer during the switching of the second bank of the low-speed multiplexer, and means at the output of the high-speed multiplexer for disabling the output of the high-speed multiplexer during switching periods.

2. An electronic time division multiplexer comprising a low-speed multiplexer including two banks of input gates each having a plurality of groups of input lines, means connecting a respective input line from each gate to a common output line, a high-speed multiplexer including a plurality of input lines each connected to a respective output line of the low-speed multiplexer and a number of signal controlling gates for connecting the input lines in timed sequence to a single output line, a clock for developing a basic timing signal for the multiplexer, a counter for deriving a high-speed switching signal for the high-speed multiplexer from the output of said clock, a counter means for deriving a low-speed switching signal for the low-speed multiplexer from the output of the high-speed counter, a synchronizer for comparing the phase of the output of the high-speed counter and low-speed counter and for introducing a correction signal into the input of the low-speed counter means upon the detection of an error in synchronization, a means for applying the high-speed switching signal to the high-speed multiplexer gates to time division multiplex signals arriving at the input lines thereof, a means for applying the low-speed switching signal from the low-speed counter to the gates of the low-speed multiplexer to enable the conduction of incoming signals to the respective output lines, and means at the output of the high-speed multiplexer for disabling the output thereof during the switching intervals of the high-speed multiplexer gates whereby a large number of signals are time division multiplexed on to a single output line with switching transients effectively eliminated from the output signal.

3. The combination in accordance with claim 2 wherein said low-speed counter comprises two counters one for driving each bank of the low-speed multiplexer gates.

4. The combination in accordance with claim 3 including means for deriving two complementary signals from the output of the high-speed counter and applying the two signals one to each of the two low-speed counters whereby the banks of the low-speed multiplexer gates are alternately switched from conducting to nonconducting condition.

5 The combination in accordance with claim 4 wherein the high-speed multiplexer gates comprise a pair of series-shunt connected field effect transistors driven in opposite phase to provide alternate series conduction and shunt blocking when in the conducting condition and series blocking and shunt conduction when in the blocking condition.

6. A multiplexer, comprising:

a first commutator for sequentially connecting a plurality of sets of input lines to a plurality of sets of output lines such that corresponding lines of every input line set in each plurality thereof are connected to the same output line;

a second commutator for sequentially connecting the output line sets of said first commutator to a terminal;

first means to control said commutators for operation such that said second commutator completes a cycle of operation during each interval in the sequence of operation of said first commutator;

second means to control the operation of said first commutator such that the connections made by its sets are made alternately;

means to connect the terminal of said second commutator as output for the multiplexer; and means to delay operation of said connecting means until any switching transients in said second commutator are dissipated.

7. The combination in accordance with claim 6 wherein said connecting means comprises a gate at the output of said second commutator and driven by said first means.